(12) United States Patent
Li et al.

(10) Patent No.: US 12,072,866 B2
(45) Date of Patent: Aug. 27, 2024

(54) DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Maocai Li, Shenzhen (CN); Zongyou Wang, Shenzhen (CN); Yifang Shi, Shenzhen (CN); Gengliang Zhu, Shenzhen (CN); Hu Lan, Shenzhen (CN); Huankun Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 88 days.

(21) Appl. No.: 17/738,612

(22) Filed: May 6, 2022

(65) Prior Publication Data

US 2022/0269670 A1 Aug. 25, 2022

Related U.S. Application Data

(63) Continuation of application No. PCT/CN2021/085854, filed on Apr. 8, 2021.

(30) Foreign Application Priority Data

May 13, 2020 (CN) .......................... 202010402598.2

(51) Int. Cl.
*G06F 16/00* (2019.01)
*G06F 16/21* (2019.01)
(Continued)

(52) U.S. Cl.
CPC ........ *G06F 16/2365* (2019.01); *G06F 16/219* (2019.01); *G06F 16/2343* (2019.01);
(Continued)

(58) Field of Classification Search
CPC .............. G06F 16/2365; G06F 16/219; G06F 16/2343; G06F 16/27; G06F 16/23;
(Continued)

(56) References Cited

U.S. PATENT DOCUMENTS 10,659,219 B1 * 5/2020 Ganeshmani ............. H04L 9/14
10,761,948 B1 * 9/2020 Zhuo ..................... H04L 9/3239
(Continued)

FOREIGN PATENT DOCUMENTS

CN  107085810 A   8/2017
CN  108876618 A   11/2018
(Continued)

OTHER PUBLICATIONS

Search Report for China Patent Application No. CN 202010402598.2 dated Sep. 30, 2021 (Chinese language) (9 pages).
(Continued)

*Primary Examiner* — Debbie M Le
(74) *Attorney, Agent, or Firm* — Crowell & Moring LLP

(57) ABSTRACT

A data processing method for blockchain technology verifies transactions. Transaction operations on a blockchain are more consistent and the accuracy of transaction data on the blockchain is improved. A first transaction operation corresponding to a first transaction request on the blockchain, and a second transaction operation corresponding to a second transaction request on the blockchain are both performed. When an operation result corresponding to either the first transaction operation and/or the second transaction operation is a failure, then the processing on a transaction operation can be rolled back to a successful operation.

20 Claims, 9 Drawing Sheets

(51) Int. Cl.
  *G06F 16/23* (2019.01)
  *G06F 16/27* (2019.01)
  *H04L 9/00* (2022.01)

(52) U.S. Cl.
  CPC ............... *G06F 16/27* (2019.01); *H04L 9/50* (2022.05); *H04L 2209/463* (2013.01)

(58) Field of Classification Search
  CPC .. G06F 11/1438; H04L 9/50; H04L 2209/463; G06Q 40/04
  See application file for complete search history.

(56) References Cited

U.S. PATENT DOCUMENTS

| | | | | |
|---|---|---|---|---|
| 11,032,083 | B2* | 6/2021 | Chao | H04L 9/50 |
| 11,388,010 | B2* | 7/2022 | Chen | G06F 9/542 |
| 11,409,795 | B2* | 8/2022 | Zhou | G06F 16/11 |
| 11,477,279 | B1* | 10/2022 | Avrilionis | H04L 9/3236 |
| 11,520,777 | B2* | 12/2022 | Carver | G06Q 20/363 |
| 2020/0134606 | A1 | 4/2020 | Todd et al. | |
| 2022/0342780 | A1* | 10/2022 | Bartram | G06F 16/2379 |
| 2023/0214832 | A1* | 7/2023 | Hu | G06Q 20/401 705/75 |

FOREIGN PATENT DOCUMENTS

| | | |
|---|---|---|
| CN | 109150943 A | 1/2019 |
| CN | 110428332 A | 11/2019 |
| CN | 110992038 A | 4/2020 |
| CN | 111028084 A | 4/2020 |
| CN | 111095326 A | 5/2020 |
| CN | 111105222 A | 5/2020 |
| CN | 111597077 A | 8/2020 |

OTHER PUBLICATIONS

Search Report for China Patent Application No. CN 202010402598.2 dated May 25, 2021 (Chinese language) (13 pages).
International Search Report and Written Opinion received for Application No. PCT/CN2021/085854 mailed Jul. 9, 2021 (English and Chinese languages) (10 pages).

* cited by examiner

1

DATA PROCESSING METHOD AND APPARATUS, COMPUTER DEVICE, AND STORAGE MEDIUM

RELATED APPLICATIONS

This application is a continuation of PCT Application No. PCT/CN2021/085854, filed Apr. 8, 2021, published as WO2021/227706 A1, entitled "DATA PROCESSING METHOD AND APPARATUS, COMPUTER DEVICE, AND STORAGE MEDIUM", which claims priority to Chinese Patent Application No. 202010402598.2, entitled "DATA PROCESSING METHOD AND APPARATUS, COMPUTER DEVICE, AND STORAGE MEDIUM" and filed with the China National Intellectual Property Administration on May 13, 2020, each of which are incorporated herein by reference in their entirety.

FIELD OF THE TECHNOLOGY

This application relates to the field of data processing technologies.

BACKGROUND OF THE DISCLOSURE

The blockchain technology may be a distributed infrastructure and computing paradigm in which data is verified and stored by using a blockchain data structure, data is generated and updated by using a new distributed node consensus algorithm, safety of data transmission and access is ensured by using cryptology, programming and operation on data are performed by using a smart contract including automation script code. A blockchain is a decentralized distributed ledger.

When a plurality of operations are performed on a blockchain, some operations may succeed and other operations may fail. Inconsistency between a plurality of operations reduces the accuracy of transaction data on the blockchain.

SUMMARY

Embodiments of this application provide a data processing method and apparatus, a computer device, and a non-transitory storage medium, to make a plurality of operations on a blockchain consistent and improve the accuracy of transaction data on the blockchain.

According to one embodiment, a data processing method is provided. The method is performed by a node on a blockchain and includes:
  obtaining an operation transaction on a blockchain; the operation transaction including a first transaction request and a second transaction request;
  performing a first transaction operation corresponding to the first transaction request, and performing a second transaction operation corresponding to the second transaction request on the blockchain; and
  performing, when an operation result corresponding to any one of the first transaction operation and the second transaction operation is a failure, rollback to a transaction operation whose operation result is success.

According to one embodiment, a data processing apparatus is provided. The apparatus is deployed on a node on a blockchain and includes:
  an obtaining module, configured to obtain an operation transaction on a blockchain; the operation transaction including a first transaction request and a second transaction request;
  an execution module, configured to: perform a first transaction operation corresponding to the first transaction request, and perform a second transaction operation corresponding to the second transaction request on the blockchain; and
  a rollback module, configured to perform, when an operation result corresponding to any one of the first transaction operation and the second transaction operation is failure, rollback to a transaction operation whose operation result is success.

In one embodiment, the first transaction request includes a first transaction account, the second transaction request includes a second transaction account, and when the first transaction operation and the second transaction operation are performed, the first transaction account and the second transaction account are in a locked state; and
  the apparatus further includes:
    a removing module, configured to: remove the locked state of the first transaction account and the second transaction account, and generate a notification message indicating that execution of the operation transaction fails.

In one embodiment, the rollback module is configured to:
  when the first transaction operation is a transaction operation whose operation result is failure and the second transaction operation is a transaction operation whose operation result is success, use the second transaction operation as a target transaction operation and perform a rollback to the target transaction operation; or
  when the second transaction operation is a transaction operation whose operation result is failure and the first transaction operation is a transaction operation whose operation result is success, use the first transaction operation as a target transaction operation and perform a rollback to the target transaction operation.

In one embodiment, the target transaction operation includes a transfer operation and an adjustment operation, the transfer operation is transferring resource data whose quantity is the same as a target transaction quantity on the blockchain, and the adjustment operation is adjusting a remaining resource quantity of a target transaction account in a transaction recording table associated with the blockchain; the transaction recording table is used to record remaining resource quantities of all transaction accounts on the blockchain; and a transaction request corresponding to the target transaction operation includes the target transaction quantity and the target transaction account.

In one embodiment, when performing a rollback to the target transaction operation, the rollback module is configured to: perform invalidation processing on a target transaction record stored in a target block; where the target block belongs to the blockchain, the target block is a block generated after the transfer operation is performed, and the target block is used to store the target transaction record; and update the remaining resource quantity of the target transaction account in the transaction recording table according to the target transaction quantity; where the updated remaining resource quantity of the target transaction account is the same as a remaining resource quantity of the target transaction account that exists before the adjustment operation is performed.

In one embodiment, the obtaining module includes:
  an obtaining unit, configured to obtain the first transaction request and the second transaction request on the blockchain; and
  a combination unit, configured to: determine an operation sequence of the first transaction request and the second transaction request, and combine the first transaction request and the second transaction request into the operation transaction according to the operation sequence.

In one embodiment, the operation sequence includes: a parallel operation sequence and a serial operation sequence; and the obtaining unit is configured to:
when the first transaction request and the second transaction request have a data dependency relationship, determine that the operation sequence of the first transaction request and the second transaction request is the serial operation sequence; or
when the first transaction request and the second transaction request have no data dependency relationship, determine that the operation sequence of the first transaction request and the second transaction request is the parallel operation sequence.

In one embodiment, the blockchain includes a first blockchain and a second blockchain, and the first blockchain and the second blockchain are associated; the first transaction request is a request on the first blockchain, and the second transaction request is a request on the second blockchain; and the execution module is configured to: perform the first transaction operation corresponding to the first transaction request on the first blockchain, and perform the second transaction operation corresponding to the second transaction request on the second blockchain.

In one embodiment, the data processing method is performed by a lightweight node, the first blockchain corresponds to a first blockchain network, the second blockchain corresponds to a second blockchain network, the first blockchain network includes the lightweight node and a first consensus node, and the second blockchain network includes the lightweight node and a second consensus node; and when performing the first transaction operation corresponding to the first transaction request on the first blockchain, and performing the second transaction operation corresponding to the second transaction request on the second blockchain, the execution module is configured to: send the first transaction request to the first consensus node, so that the first consensus node performs the first transaction operation on the first blockchain; and send the second transaction request to the second consensus node, so that the second consensus node performs the second transaction operation on the second blockchain.

In one embodiment, the apparatus further includes:
a receiving module, configured to: receive the operation result of the first transaction operation that is sent by the first consensus node, and receive the operation result of the second transaction operation that is sent by the second consensus node.

According to one embodiment, a computer device is provided, including a memory and a processor, the memory storing a computer program, and when the computer program is executed by the processor, the processor being caused to perform the method in the foregoing embodiment.

According to one embodiment, a non-transitory computer storage medium is provided, storing a computer program, the computer program including program instructions, and the program instructions, when executed by a processor, performing the method in the foregoing embodiment.

According to one embodiment, a computer program product is provided, the computer program product, when executed, being configured to perform the method in the foregoing embodiment.

In the embodiments, the first transaction operation and the second transaction operation are performed on the blockchain, and when execution of any one of the first transaction operation and the second transaction operation fails, that is, the operation result corresponding to any one of the first transaction operation and the second transaction operation is failure, the rollback processing is performed on the transaction operation whose operation result is success. The rollback processing can ensure consistency of the plurality of transaction operations on the blockchain, so that the blockchain can return to a state that exists before the first transaction operation and second transaction operation are performed, to avoid inaccurate transaction data on the blockchain and improve the stability of the blockchain.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Blockchain: It is a new application mode of computer technologies such as distributed data storage, peer-to-peer (P2P) transmission, a consensus mechanism, and an encryption algorithm. The blockchain is essentially a decentralized database and is a string of data blocks generated through association by using a cryptographic method. Each data block includes information one or more transaction information, the information being used for verifying the validity of information of the data block (anti-counterfeiting) and generating a next data block.

Figure 1:
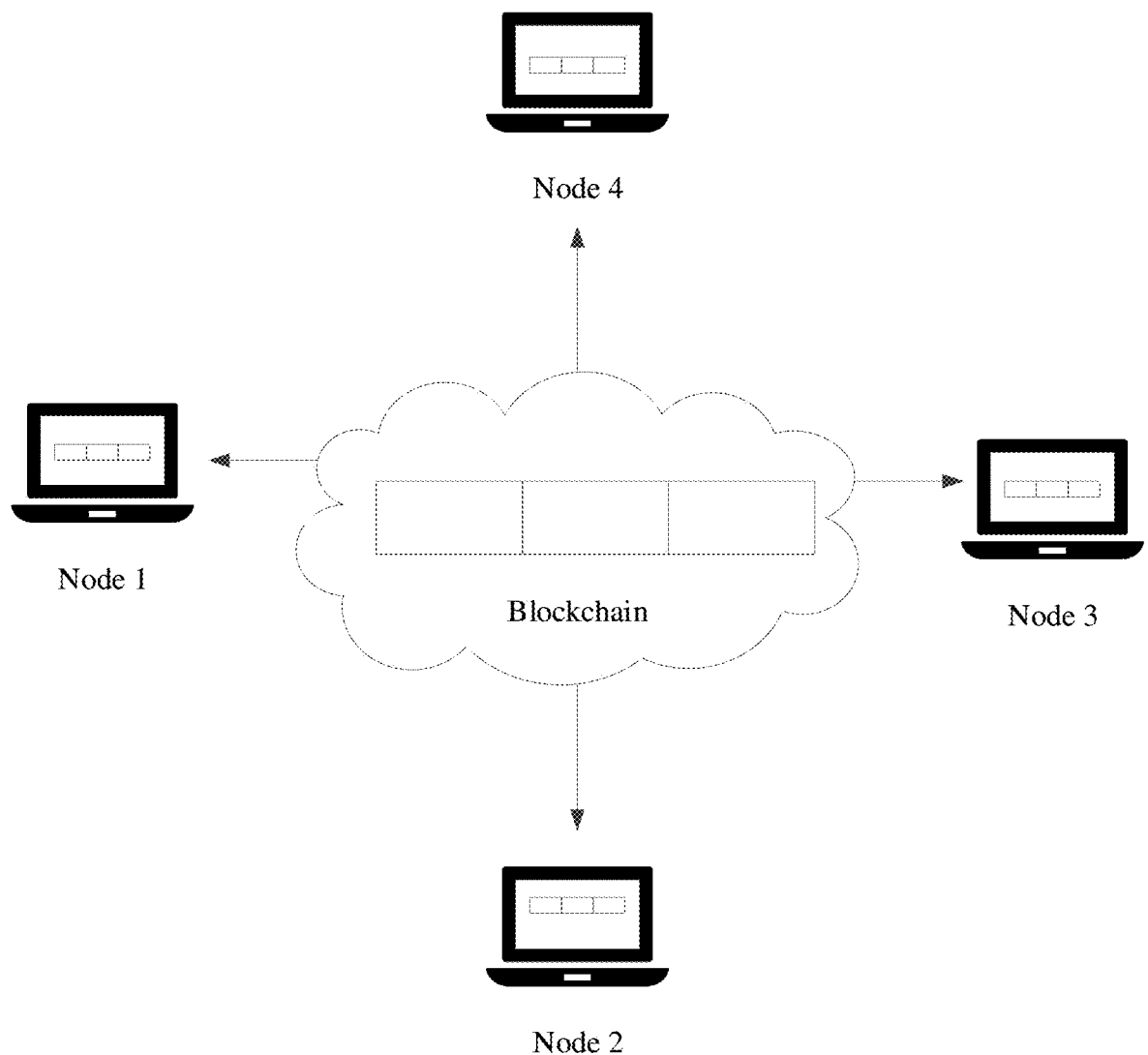
FIG. 1 is a schematic diagram of a blockchain network according to an embodiment of the application.

FIG. 1 is a schematic diagram of a blockchain network according to an embodiment of the application. Four nodes (for example, a node 1, a node 2, a node 3, and a node 4) are used as an example. The node 1, the node 2, the node 3, and the node 4 may be combined into a blockchain network. Each node may store a same blockchain, and the four nodes may also be referred to as blockchain nodes. Each node may include a hardware layer, an intermediate layer, an operating system layer, and an application layer. It may be understood that the node may include a computer device.

The node may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The node may be a terminal device, such as, a smartphone, a tablet computer, a notebook computer, a desktop computer, a smart speaker, or a smart watch, but is not limited to just these examples. Each node may be directly or indirectly connected in a wired or wireless communication manner in different examples.

Cloud technologies are a general term for a network technology, an information technology, an integration technology, a management platform technology, an application technology, and the like applied based on the business mode of cloud computing, and may form a resource pool used on demand flexibly and conveniently. Currently, the background service of a technical network system requires many computing and storage resources, for example, video websites, image websites, and more portal websites. With rapid development and application of the Internet industry, in the future, each item may have an identifier, all identifiers need to be transmitted to a background system for logical processing, data at different levels will be processed separately, and all types of industry data require powerful system support. This can be implemented only through cloud computing.

Currently, cloud technologies are mainly categorized into the basic cloud technology type and the cloud application type. The basic cloud technology type may be subcategorized into: cloud computing, cloud storage, database, big data, and the like. The cloud application type may be subcategorized into: medical cloud, cloud IoT, cloud security, cloud calling, private cloud, public cloud, hybrid cloud, cloud game, cloud education, cloud conference, cloud socializing, artificial intelligence cloud service, and the like.

A data processing method of this application may relate to cloud computing and cloud storage of cloud technologies.

Cloud computing is a computing mode and distributes computing tasks on a resource pool formed by many computers, so that various application systems may obtain a computing capability, a storage space, and an information service on demand. A network that provides a resource is referred to as "cloud". A resource in "cloud" may be infinitely expanded from the viewpoint of a user, and may be obtained and expanded at any time, used on demand, and paid based on usage.

In this application, a node may obtain a sufficient computing capability and a sufficient storage space through a cloud computing technology, and then perform a first transaction operation and a second transaction operation in this application.

Cloud storage is a new concept developed based on the concept of cloud computing. A distributed cloud storage system (abbreviated as a storage system below) is a storage system that combines many different types of storage devices (storage devices are also referred to as storage nodes) in a network through application software or an application interface based on cluster application, a grid technology, a distributed storage file system, and other functions, so that the storage devices work in coordination with each other to jointly provide data storage and service access functions to the outside.

In this application, a blockchain may be stored on "cloud" by a node through a cloud storage technology. When a block needs to be read from the blockchain or written into the blockchain, the block may be pulled from a cloud storage device or sent to a cloud storage device to reduce storage pressure of a node.

An application scenario of the data processing method of this application is: an operation transaction is performed on a blockchain. To be specific, when a plurality of transaction operations are performed on the blockchain and execution of some of the plurality of transaction operations succeeds and execution of other transaction operations fails, the transaction operations whose execution succeeds are rolled back to ensure consistency and atomicity of the plurality of transaction operations on the blockchain and avoid inaccurate transaction data on the blockchain, thereby improving the stability of the blockchain.

Figure 2A:
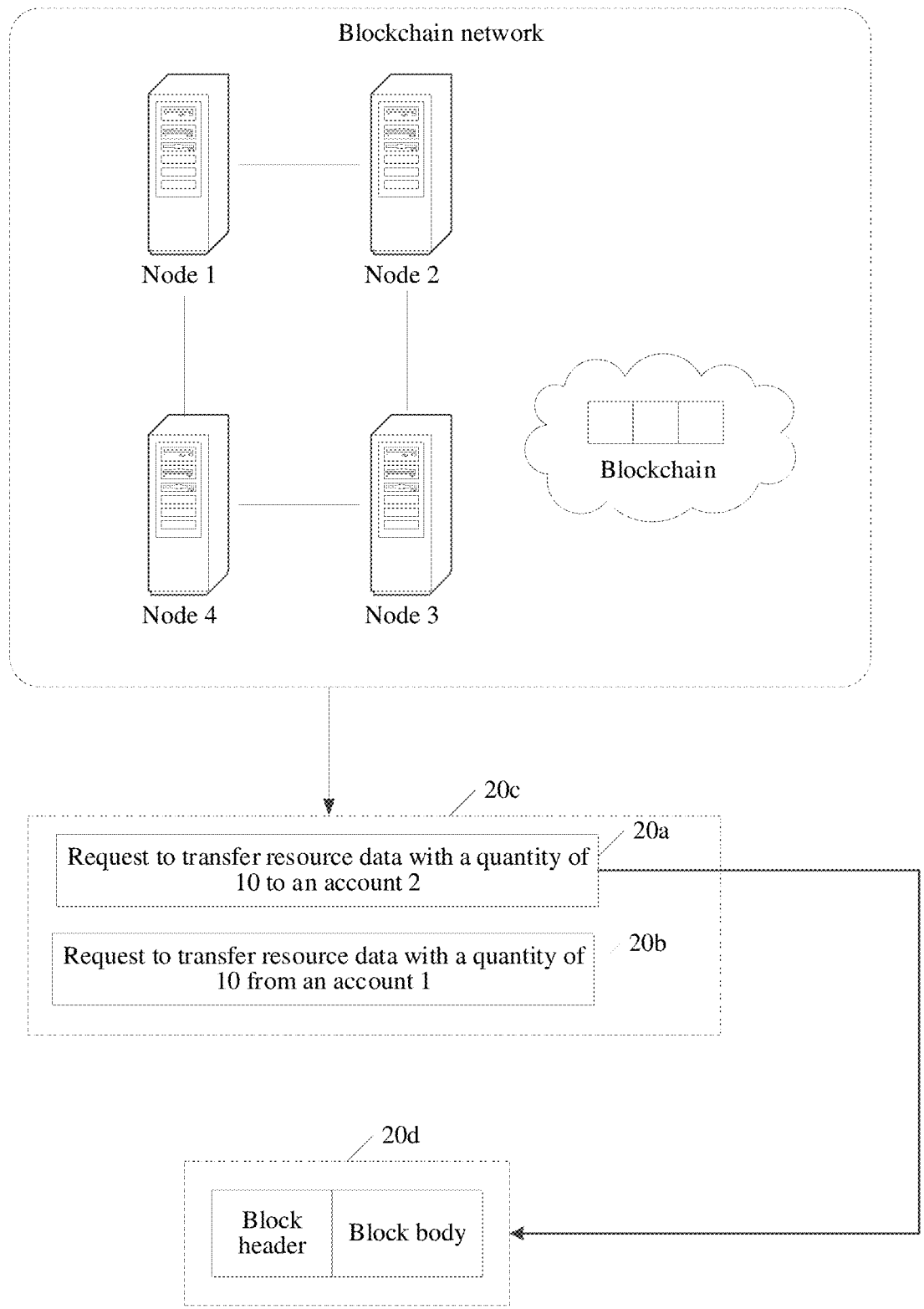
FIG. 2a and FIG. 2b are schematic diagrams of data processing scenarios according to embodiments of this application.
Figure 2B:
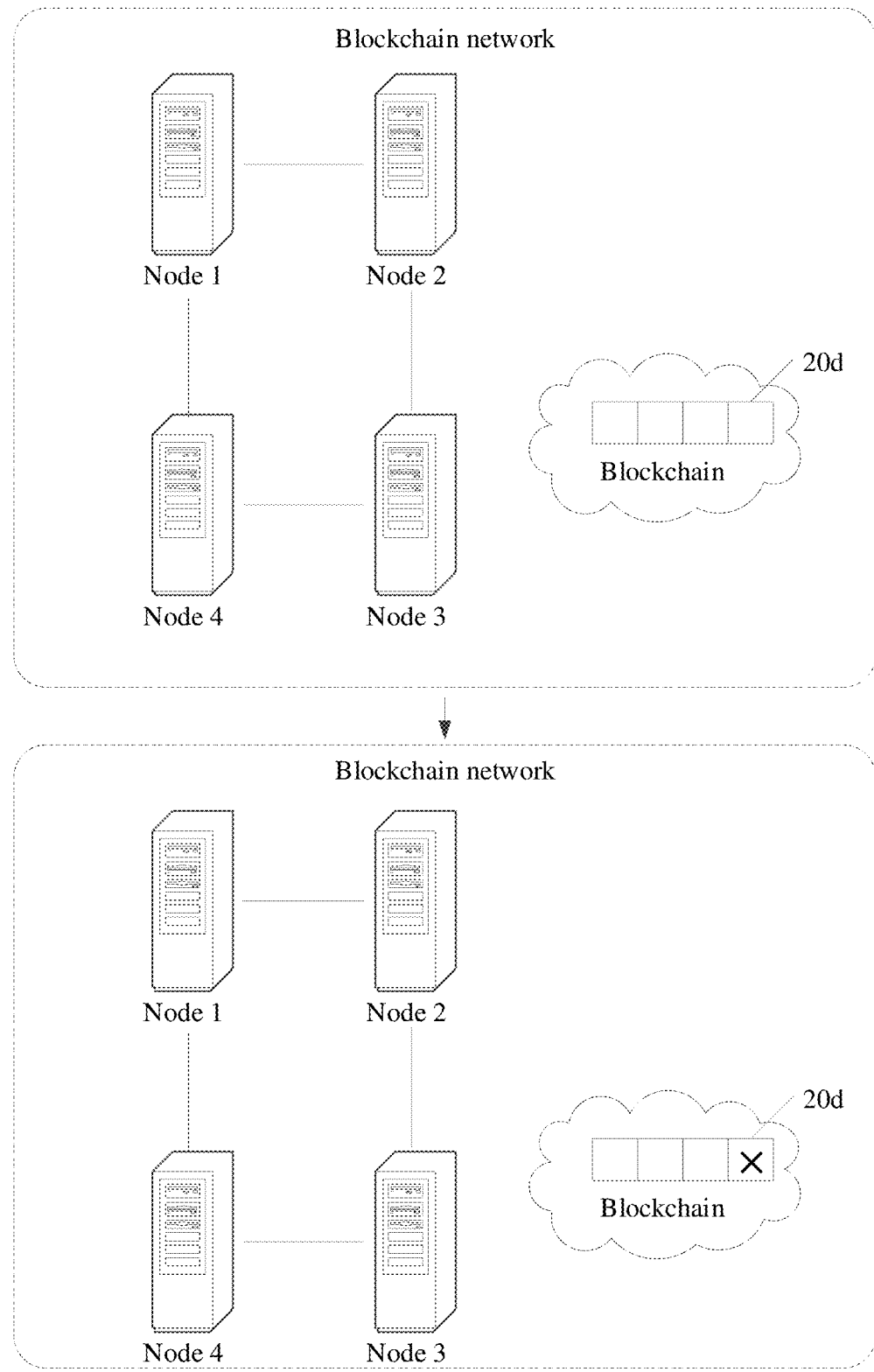

In the following embodiments corresponding to FIG. 2a and FIG. 2b, a resource transfer operation on a blockchain is used as an example for detailed description. FIG. 2a and FIG. 2b are schematic diagrams of data processing scenarios according to embodiments of this application. A blockchain network shown in FIG. 2a includes four nodes, and the four nodes are: a node 1, a node 2, a node 3, and a node 4. All the four nodes store a blockchain. As can be seen from FIG. 2a, the blockchain includes three blocks.

A node obtains an operation transaction 20c. The operation transaction 20c includes a request 20a (that is, a first transaction request) and a request 20b (that is, a second transaction request). Specific content of the request 20a is: requesting to transfer resource data with a quantity of 10 to an account 2 on the blockchain. Specific content of the request 20b is: requesting to transfer resource data with a quantity of 10 from an account 1 on the blockchain. Generally, the operation transaction 20c requests to transfer resource data with a quantity of 10 from the account 1 to the account 2 on the blockchain.

Assuming that the request 20a and the request 20b have a data dependency relationship and the request 20b depends on the request 20a, the node first performs a transaction operation 1 (that is, the first transaction operation) requested by the request 20a: the node determines whether the account 2 is an account on the blockchain, whether a current length of the blockchain reaches a maximum storage capacity, and the like. If determining that the account 2 is an account on the blockchain and determining that the current length of the blockchain does not reach the maximum storage capacity, the node transfers the resource data with the quantity of 10 to the account 2. Execution of the transaction operation 1 succeeds. The essence of transferring resource data on the blockchain is to store a transaction record corresponding to the request 20a on the blockchain.

A specific process of storing the transaction record corresponding to the request 20a on the blockchain is: obtaining the transaction record 1 corresponding to the request 20a, where the transaction record 1 may be specifically: (a transfer-out address: none, a transfer-in address: the account 2, and a quantity: 10), storing the transaction record 1 on a block body, calculating a Merkle root of the transaction record 1, obtaining a hash value of the last block (that is, the third block) of the current blockchain and a current timestamp, storing the Merkle root, the hash value of the last block, and the current timestamp on a block header, combining the block header and the block body that stores the transaction record 1 into a block 20d, and adding the generated new block 20d to the blockchain.

As shown in FIG. 2b, after execution of the transaction operation 1 succeeds, the blockchain includes four blocks, and the last block is the generated new block 20d. The block 20d stores the transaction record 1 corresponding to the request 20a.

After execution of the transaction operation 1 succeeds, the node then performs a transaction operation 2 (that is, a second transaction operation) requested by the request 20b: the node first determines whether the account 1 is an account on the blockchain, whether the current length of the blockchain reaches a maximum storage capacity, and the like. Because the request 20b requests to transfer resource data from the account 1, the node further needs to determine whether the remaining resource quantity of the account 1 is not less than 10. Certainly, if determining that the account 1 does not exist on the blockchain, or determining that the current length of the blockchain reaches the maximum storage capacity (that is, no data can be written into the blockchain), or determining that the remaining resource quantity of the account 1 is less than 10, it indicates that execution of the transaction operation 2 fails.

In this case, execution of the transaction operation 1 corresponding to the request 20a succeeds, but the transaction operation 2 corresponding to the request 20b fails, and the node needs to roll back the transaction operation (that is, the transaction operation 1) whose execution succeeds. A specific process of rolling back the transaction operation 1 is: because the transaction record 1 corresponding to the request 20a has been stored on the blockchain after execution of the transaction operation 1 succeeds, the transaction record 1 on the blockchain needs to be invalidated. Besides, because the block 20d stores only the transaction record 1, the generated new block 20d may be set to an invalid block.

As can be seen through analysis, if the transaction operation 1 is not rolled back, the resource data with the quantity of 10 is incorrectly "added" to the account 2, that is, the resource data with the quantity of 10 is incorrectly "added" to the blockchain. This type of resource data that is incorrectly added because a plurality of transaction operations are inconsistent is incorrect transaction data on the blockchain. It can be seen that incorrect transaction data damages the stability of the blockchain.

When the remaining resource quantity of the account 1 and the remaining resource quantity of the account 2 are subsequently counted based on the blockchain, because the block 20d is an invalid block and the transaction record 1 of the block 20d is an invalid transaction record, the block 20d may not be traversed when blocks on the blockchain are traversed. Alternatively, the transaction record 1 in the block 20d may not be counted when all blocks on the blockchain are traversed.

Alternatively, when a resource transfer-out operation is subsequently performed on the account 2, because the transfer-in operation performed on the account 2 is rolled back, assets of the account 2 do not include the resource data with the quantity of 10 corresponding to the transfer-in operation.

As can be seen from above, although execution of the operation transaction 20c fails, the blockchain and the account 1 and the account 2 on the blockchain return to the state that exists before the operation transaction 20c is performed, that is, no resource data is transferred from the account 1 and no resource data is transferred to the account 2. A plurality of transaction operations have consistency and atomicity, which can ensure the accuracy and integrity of transaction data on the blockchain.

For a specific process of obtaining the operation transaction (for example, the transaction 20c in the foregoing embodiment), performing the first transaction operation (for example, the operation 1 in the foregoing embodiment), performing the second transaction operation (for example, the operation 2 in the foregoing embodiment), and performing rollback processing (for example, invalidating the transaction record 1 and setting the block 20d to an invalid block), may also refer to embodiments corresponding to the following FIG. 3 to FIG. 6.

Figure 3:
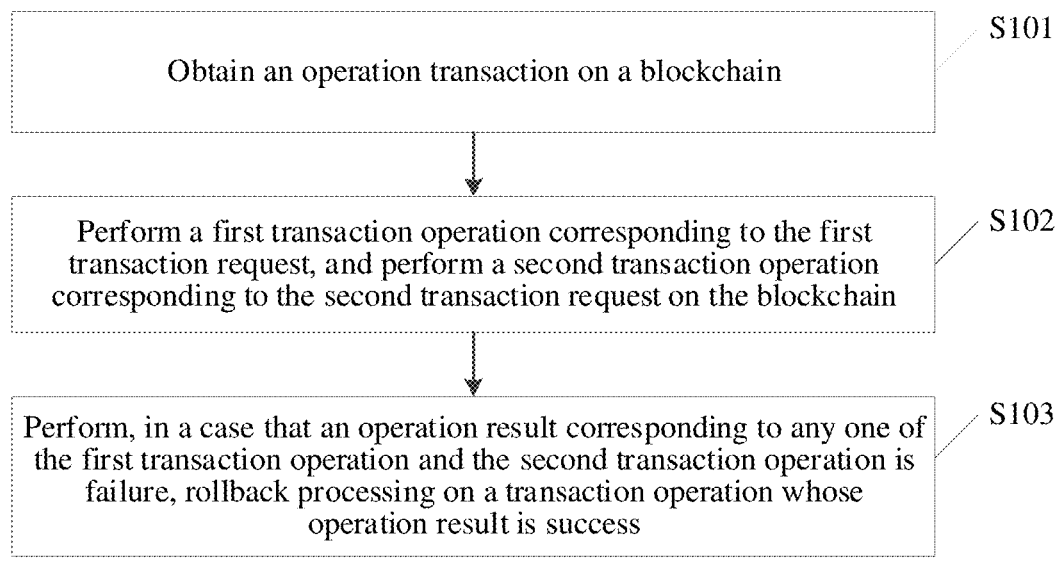
FIG. 3 is a schematic diagram of a data processing method according to an embodiment of this application.

FIG. 3 is a schematic diagram of a data processing method according to an embodiment of this application. The data processing method includes the following steps:

S101: Obtain an operation transaction on a blockchain. The operation transaction includes a first transaction request and a second transaction request.

The data processing method of this application may be applied to a blockchain. In the following embodiment, a blockchain node (for example, a node in the foregoing embodiment) is an execution entity. The blockchain node is any node in a blockchain network (for example, the network formed by the node 1, the node 2, the node 3, and the node 4 in the embodiments corresponding to FIG. 2a and FIG. 2b).

The blockchain node obtains an operation transaction (for example, the operation transaction 20c in the embodiments corresponding to FIG. 2a and FIG. 2b) on the blockchain. The operation transaction includes at least two transaction requests. Two of at least two transaction requests are used as an example below. The two transaction requests are referred to as a first transaction request (for example, the request 20a in the embodiments corresponding to FIG. 2a and FIG. 2b) and a second transaction request (for example, the request 20b in the embodiments corresponding to FIG. 2a and FIG. 2b).

For example, the first transaction request is: requesting to transfer resource data with a quantity of 10 from the account 1 to the account 2, and the second transaction request is: requesting to transfer resource data with a quantity of 20 from the account 3 to the account 4. The resource data may be various virtual resources, for example, currency or game coin. Game coin is used as an example, and the resource data with the quantity of 10 may be 10 game coins. The operation transaction that includes the two transaction requests requests to transfer resource data from the account 1 to the account 2 and transfer resource data from the account 3 to the account 4.

In another example, the first transaction request is: requesting to transfer resource data with a quantity of 30 from an account 5; and the second transaction request is: requesting to transfer resource data with a quantity of 30 to an account 6. The operation transaction that includes the two transaction requests requests to transfer resource data from the account 5 to the account 6.

The first transaction request includes a transaction account (referred to as a first transaction account) and a transaction quantity (referred to as a first transaction quantity). The second transaction request also includes a transaction account (referred to as a second transaction account) and a transaction quantity (referred to as a second transaction quantity). For example, in the foregoing example, the account 1 and the account 2 correspond to the first transaction account and the resource quantity 10 corresponds to the first transaction quantity; and the account 3 and the account 4 correspond to the second transaction account and the resource quantity 20 corresponds to the second transaction quantity.

The following describes how to obtain the operation transaction:

The blockchain node obtains the first transaction request and the second transaction request on the blockchain. The first transaction request and the second transaction request may be initiated by a user, or may be generated as automatically triggered by a smart contract. The blockchain node obtains the first transaction request and the second transaction request on the blockchain, determines an operation sequence of the first transaction request and the second transaction request, and then combines the first transaction request and the second transaction request into an operation transaction according to the operation sequence.

Generally, the operation sequence includes a parallel operation sequence and a serial operation sequence. Based on this, the blockchain node may determine the operation sequence in the following manner: the blockchain node determines whether the first transaction request and the second transaction request have a data dependency relationship, and if yes, determines that the operation sequence of the first transaction request and the second transaction request is the serial operation sequence, and further needs to determine the execution sequence of the first transaction request and the second transaction request. Otherwise, when the first transaction request and the second transaction request have no data dependency relationship, the blockchain node determines that the operation sequence of the first transaction request and the second transaction request is the parallel operation sequence.

The data dependency relationship herein is the mutual constraint relationship between the first transaction request and the second transaction request. For example, if the first transaction request is: requesting to transfer resource data with a quantity of 10 from the account 1 to the account 2 and the second transaction request is: requesting to transfer resource data with a quantity of 20 from the account 3 to the account 4, as can be seen, the first transaction request and the second transaction request have no data dependency relationship. Therefore, the operation sequence of the first transaction request and the second transaction request may be a parallel operation sequence.

For example, the first transaction request requests to transfer resource data with a quantity of 10 from the account 1 to the account 2 and the second transaction request requests to transfer resource data with a quantity of 20 from the account 1 to the account 3. The first transaction request and the second transaction request both request to transfer resource data from the account 1. After execution of the transaction operation corresponding to the first transaction request (or the second transaction request) succeeds, the remaining resource quantity of the account 1 may be insufficient for successful execution of the transaction operation corresponding to the second transaction request (or the first transaction request). In this case, the first transaction request and the second transaction request have a data dependency relationship. Therefore, the operation sequence of the first transaction request and the second transaction request is the serial operation sequence. In addition, there may be other examples of an execution sequence of the first transaction request and the second transaction request.

S102: Perform a first transaction operation corresponding to the first transaction request, and perform a second transaction operation corresponding to the second transaction request on the blockchain.

The first transaction request and the second transaction request may have an operation sequence. The blockchain node may obtain the operation sequence of the first transaction request and the second transaction request, and perform the first transaction operation and the second transaction operation according to the operation sequence.

If the operation sequence of the first transaction request and the second transaction request is the serial operation sequence, the blockchain node then obtains the execution sequence of the first transaction request and the second transaction request, and sequentially performs the first transaction operation corresponding to the first transaction request and the second transaction operation corresponding to the second transaction request on the blockchain according to the execution sequence.

If the operation sequence of the first transaction request and the second transaction request is the parallel operation sequence, the blockchain node concurrently performs the first transaction operation corresponding to the first transaction request and the second transaction operation corresponding to the second transaction request on the blockchain.

The first transaction operation and the second transaction operation may include at least one of a transfer operation of resource data (the resource data may be game coin) on the blockchain, a transfer operation of consumption proof information (the consumption proof information may be a consumption invoice) on the blockchain, an authentication certification operation on the blockchain, a logistics anti-counterfeiting traceability certification operation on the blockchain, an adjustment operation of a recording table associated with the blockchain, and the like.

The transfer operation of resource data (or consumption proof information) is to transfer resource data between accounts on the blockchain. The authentication certification operation is to add a right and interest certification file or the like to the blockchain (that is, registration as commonly understood), and the right and interest may be subsequently queried from the blockchain. The logistics anti-counterfeiting traceability certification operation is to store both production and sales processes of a commodity on the blockchain and ensure that information of a sold commodity is permanently recorded based on tamper-resistance of data on the blockchain, to implement traceability of the entire process from production to sales of the commodity. The adjustment operation of a recording table is to adjust remaining resource quantities of all accounts on the blockchain in the recording table.

For example, the first transaction operation is a transfer operation of resource data, and the second transaction operation is an operation of adding a right and interest certification file to the blockchain, which, as commonly understood, is that a user pays a particular quantity of resource data on the blockchain and may store a right and interest certification file on the blockchain. Alternatively, the first transaction operation is a transfer operation of resource data, and the second transaction operation is an operation of adding logistics of a commodity to the blockchain, which, as commonly understood, is that a user pays a particular quantity of resource data on the blockchain and may store a logistics trajectory and a production video of the commodity on the blockchain.

In the following, for example, both the first transaction operation and the second transaction operation include a transfer operation (that is, the transfer operation of resource data in the foregoing) and an adjustment operation (that is, the adjustment operation of a recording table in the foregoing).

To ensure isolation in a process of performing the operation transaction by the blockchain node, the first transaction account and the second transaction account are in a locked state in a process of performing the first transaction operation and the second transaction operation. In other words, a transaction operation other than the operation transaction cannot be performed on the first transaction account and the second transaction account in the locked state.

The first transaction operation includes a transfer operation (referred to as a first transfer operation) and an adjustment operation (referred to as a first adjustment operation). The first transfer operation is to transfer resource data with a first transaction quantity on the blockchain, and the first adjustment operation is to adjust a remaining resource quantity of the first transaction account in the transaction recording table associated with the blockchain. The first transfer operation and the first adjustment operation may also be referred to as sub-operations of the first transaction operation. The transaction recording table is used to record remaining resource quantities of all transaction accounts on the blockchain. Certainly, all transaction accounts on the blockchain include the first transaction account and the second transaction account.

Similarly, the second transaction operation also includes a transfer operation (referred to as a second transfer operation) and an adjustment operation (referred to as a second adjustment operation). The second transfer operation is to transfer resource data with a second transaction quantity on the blockchain, and the second adjustment operation is to adjust a remaining resource quantity of the second transaction account in the transaction recording table associated with the blockchain.

As can be seen, objectives of the first transaction operation and the second transaction operation are basically the same, except that an operation object of one is the first transaction account and the first transaction amount, and an operation object of the other is the second transaction account and the second transaction amount.

In the following, the first transaction operation is used as an example, to describe how to perform the first transfer operation and the first adjustment operation. First, how to perform the first transfer operation is described.

Resource data transfer on the blockchain is equivalent to a series of operations such as broadcasting a transaction record in a blockchain network, packaging a transaction record into a block, and adding the block to the blockchain. In other words, once the transaction record is added to the blockchain, it proves that the transfer operation of the resource data is completed.

The first transaction account may include a first transfer-out account and a first transfer-in account. The blockchain node may obtain a current remaining resource quantity of the first transfer-out account from the transaction recording table, and if the remaining resource quantity of the first transfer-out account is not less than the first transaction quantity, generate a transaction record (referred to as a first transaction record) corresponding to the first transaction request. For example, the first transaction request is: requesting to transfer resource data with a quantity of 10 from the account 1 to the account 2. It is obtained by querying the transaction recording table that the remaining resource quantity of the account 1 is 40. Therefore, the remaining resource quantity of the account 1 is greater than the first transaction quantity, the first transaction record may be generated: (a transfer-out address: the account 1, a transfer-in address: the account 2, and the quantity: 10).

Certainly, if the remaining resource quantity of the first transfer-out account is less than the first transaction quantity, or there is no first transfer-out account or first transfer-in account on the blockchain, it indicates that currently a resource data transfer condition is not satisfied, and it may be determined that execution of the first transfer operation fails. Then, it indicates that execution of the first transaction operation fails, and execution of another sub-operation that has not been performed in the first transaction operation may be stopped.

After obtaining the first transaction record, the blockchain node adds the first transaction record to a block body, obtains a hash value of the last block on the current blockchain, obtains a Merkel root of the first transaction record, adds the hash value, the Merkel root, and a current timestamp to a block header, combines the block body to which the first transaction record is added and the block header into a block (referred to as a first block, for example, the block 20d in the embodiments corresponding to FIG. 2a and FIG. 2b), and adds this new first block to the blockchain.

After adding the transaction record to the blockchain, the blockchain node succeeds in performing the first transfer operation.

How to perform the first adjustment operation is described below.

The remaining resource quantity of the first transfer-out account and the remaining resource quantity of the first transfer-in account are obtained from the transaction recording table. If there is no first transfer-out account or first transfer-in account in the transaction recording table, or the remaining resource quantity of the first transfer-out account is less than the first transaction quantity, it indicates that currently a resource data transfer condition is not satisfied, and it may be determined that execution of the first adjustment operation fails. Then, it indicates that execution of the first transaction operation fails, and execution of another sub-operation that has not been performed in the first transaction operation may be stopped.

Otherwise, if there is the first transfer-out account and the first transfer-in account in the transaction recording table, and the remaining resource quantity of the first transfer-out account is not less than the first transaction quantity, the remaining resource quantity of the first transfer-out account and the remaining resource quantity of the first transfer-in account are adjusted according to the first transaction request.

For example, the first transaction request is: requesting to transfer resource data with a quantity of 10 from the account 1 to the account 2. It is obtained by querying the transaction recording table that currently the remaining resource quantity of the account 1 is 40 and the remaining resource quantity of the account 2 is 20. The first adjustment operation is to adjust the remaining resource quantity of the account 1 to: 40−10=30, and adjust the remaining resource quantity of the account 2 to: 20+10=30 in the transaction recording table.

The first transfer operation on the blockchain and the first adjustment operation in the transaction recording table may be concurrently performed, or may be sequentially performed.

The second transfer operation and the second adjustment operation of the second transaction operation are basically the same as the first transfer operation and the first adjustment operation, as long as the operation object is modified from the first transfer-out account and the first transfer-in account to the second transfer-out account and the second transfer-in account and the first transaction quantity is modified to the second transaction quantity. Therefore, after execution of the second transfer operation succeeds, an additional block (referred to as a second block) is added on the blockchain, and the second block is used to store the second transaction record. After the second adjustment operation is performed, the remaining resource quantity of the second transaction account in the transaction recording table is updated.

S103: Perform, when an operation result corresponding to any one of the first transaction operation and the second transaction operation is failure, rollback to a transaction operation whose operation result is success.

When execution of the first transaction operation fails and execution of the second transaction operation succeeds, it indicates that an operation result corresponding to one of the first transaction operation and the second transaction operation is failure. In this case, the second transaction operation whose operation result is success is used as the target transaction operation, and rollback processing is performed on the target transaction operation (that is, the second transaction operation).

When execution of the first transaction operation succeeds and execution of the second transaction operation fails, it indicates that an operation result corresponding to one of the first transaction operation and the second transaction operation is failure. In this case, the first transaction operation whose operation result is success is used as the target transaction operation, and rollback processing is performed on the target transaction operation (that is, the first transaction operation).

A transaction request corresponding to the target transaction operation is referred to as a target transaction request, a transaction account included in the target transaction request is referred to as a target transaction account, and a transaction quantity included in the target transaction request is referred to as a target transaction quantity. As can be seen, the target transaction request herein corresponds to the first transaction request or the second transaction request, the target transaction account corresponds to the first transaction account or the second transaction account, and the target transaction quantity corresponds to the first transaction quantity or the second transaction quantity.

As can be seen from the foregoing, the target transaction operation may include a transfer operation and an adjustment operation, the transfer operation is transferring resource data whose quantity is the same as a target transaction quantity on the blockchain, and the adjustment operation is adjusting a remaining resource quantity of a target transaction account in a transaction recording table associated with the blockchain. After the transfer operation of the target transaction operation is performed, a new block (referred to as a target block, where the target block herein is the first block or the second block) is generated on the blockchain, and a block body of the block stores a transaction record (referred to as a target transaction record, where the target transaction record herein is the first transaction record or the second transaction record).

Because the target transaction operation includes a transfer operation and an adjustment operation, rollback processing needs to be performed on these two operations. A sequence of rollback processing of these two operations may vary in different examples, and rollback processing may be concurrently performed on these two operations. A specific process of rollback processing of the transfer operation is as follows:

In one embodiment, rollback processing may be performed on the target transaction operation in the following manner: the blockchain node invalidates the target transaction record stored in the target block, so that the target transaction record becomes an invalid transaction record. In some examples, if the target block stores only the target transaction record and stores no other transaction record, the blockchain node may further set the target block as an invalid block. Subsequently, when the remaining resource quantity of the target transaction account is determined by traversing the blocks of the blockchain, because the target transaction record has been invalidated, the target transaction record is not counted. Further, if the target block is an invalid block, the target block even may not be traversed.

Alternatively, the blockchain node generates a new transaction request (referred to as a rollback transaction request) according to the target transaction request. A transaction account and a transaction quantity in the rollback transaction request are exactly the same as those in the target transaction request. The difference lies in that a transfer-in account in the target transaction request is a transfer-out account in the rollback transaction and a transfer-out account in the target transaction request is a transfer-in account in the rollback transaction.

For example, the target transaction request is: requesting to transfer resource data with a quantity of 10 from the account 1 to the account 2, and the target rollback transaction request is: requesting to transfer resource data with a quantity of 10 from the account 2 to the account 1.

The blockchain node may perform the transaction operation corresponding to the rollback transaction request. After the transaction operation corresponding to the rollback transaction request is performed, the effect reached is equivalent to that reached when rollback processing is performed on the transfer operation of the target transaction operation.

A specific process of rollback processing of the adjustment operation is as follows:

The blockchain node obtains a target transaction quantity in the target transaction request; and updates the remaining resource quantity of the target transaction account in the transaction recording table according to the target transaction quantity; so that the updated remaining resource quantity of the target transaction account is the same as a remaining resource quantity of the target transaction account that exists before the adjustment operation is performed.

For example, the target transaction request is: requesting to transfer resource data with a quantity of 10 to the account 1. Before the adjustment operation is performed, the remaining resource quantity of the account 1 is 20. After execution of the adjustment operation succeeds, the remaining resource quantity of the account 1 is 20+10=30. Performing a rollback to the adjustment operation is to adjust the remaining resource quantity of the account 1 back to 20: 30−10=20.

For example, the target transaction request is: requesting to transfer resource data with a quantity of 10 from the account 1 to the account 2. Before the adjustment operation is performed, the remaining resource quantity of the account 1 is 20, and the remaining resource quantity of the account 2 is 30. After execution of the adjustment operation succeeds, the remaining resource quantity of the account 1 is 20−10=10, and the remaining resource quantity of the account 2 is 30+10=40. Performing a rollback to the adjustment operation is to adjust the remaining resource quantity of the account 1 back to 20: 10+10=20, and adjust the remaining resource quantity of the account 2 back to 30: 40−10=30.

After rollback processing is performed on the target transaction operation, the locked state of the first transaction account and the locked state of the second transaction account are removed.

A transaction operation may include a plurality of sub-operations (for example, the transfer operation and the adjustment operation). Only when execution of the plurality of sub-operations all succeeds, it is determined that execution of the transaction operation succeeds. Otherwise, once execution of at least one sub-operation fails, it is determined that execution of the transaction operation fails. Therefore, during rollback processing, not only a transaction operation that succeeds needs to be rolled back, but also a sub-operation that succeeds in a transaction operation that fails needs to be rolled back.

For example, the first transaction operation includes a first transfer operation and a first adjustment operation, and the second transaction operation includes a second transfer operation and a second adjustment operation. If the first transfer operation fails, but the first adjustment operation succeeds, it may indicate that the first transaction operation fails. If the second transfer operation succeeds and the second adjustment operation succeeds, it may indicate that the second transaction operation succeeds. In this case, the blockchain node needs to perform a rollback to the second transfer operation and the second adjustment operation, and also needs to perform a rollback to the first adjustment operation.

In another example, when both the first transaction operation and the second transaction operation fail and both the first transaction operation and the second transaction operation include a plurality of sub-operations, rollback processing needs to be performed on a sub-operation that succeeds in the first transaction operation and a sub-operation that succeeds in the second transaction operation.

As can be seen from the foregoing, when execution of any one of the first transaction operation and the second transaction operation fails, the rollback processing is performed on the transaction operation that succeeds. The rollback processing can ensure consistency of the plurality of transaction operations on the blockchain, so that the blockchain can return to a state that exists before the first transaction operation and second transaction operation are performed, to avoid inaccurate transaction data on the blockchain and improve the stability of the blockchain.

Figure 4:
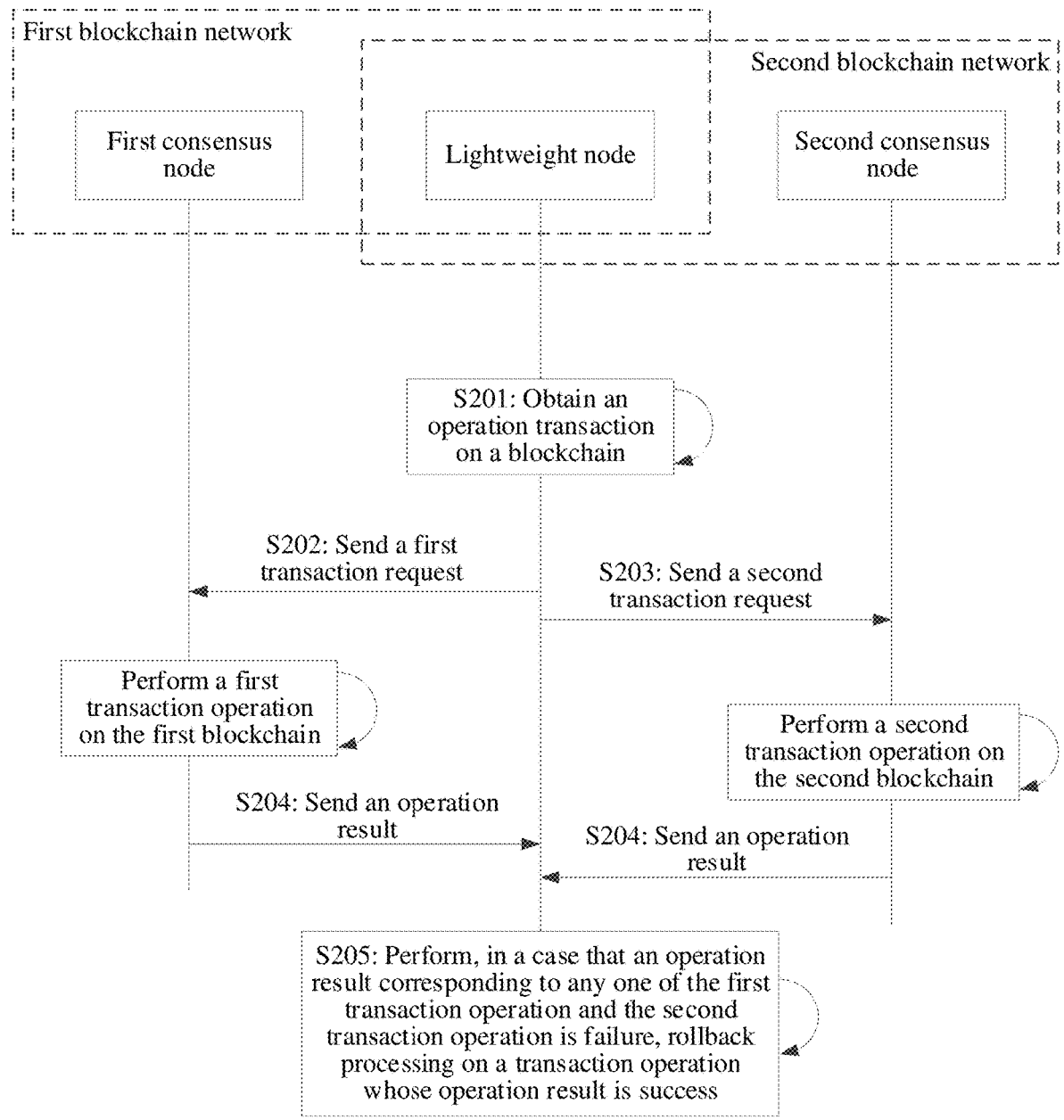
FIG. 4 is a schematic interaction diagram of a data processing method according to an embodiment of this application.

FIG. 4 is a schematic interaction diagram of a data processing method according to an embodiment of this application. The data processing method is performed by a lightweight node, a first consensus node, and a second consensus node. An interaction process is as follows:

S201: A lightweight node obtains an operation transaction on a blockchain. The operation transaction includes a first transaction request and a second transaction request.

Blockchain nodes may be categorized into a lightweight node (a lightweight node may be a simplified payment verification (spv) node) and a consensus node. A consensus node stores a complete blockchain and participates in consensus. The lightweight node may not store a blockchain and may not participate in consensus, and when there is a service requirement, may synchronize a block from the consensus node at any time.

The blockchain in this application includes a first blockchain and a second blockchain. The first blockchain and the second blockchain are associated with each other, which, as commonly understood, means that the first blockchain and the second blockchain provide the same service or similar services. A blockchain network corresponding to the first blockchain is referred to as a first blockchain network, and a blockchain network corresponding to the second blockchain is referred to as a second blockchain network. Both the lightweight node and the first consensus node are nodes in the first blockchain network, and the first consensus node is also a consensus node in the first blockchain network. Both the lightweight node and the second consensus node are nodes in the second blockchain network, and the second consensus node is also a consensus node in the second blockchain network.

A plurality of blockchains are deployed in different blockchain networks, but the plurality of blockchains are associated with each other and may provide the same service or similar services. Distributed deployment can reduce the storage requirement of each node and improve performance of the blockchain.

The lightweight node obtains the operation transaction. The operation transaction includes a first transaction request on the first blockchain and a second transaction request on the second blockchain. For a specific process of obtaining the operation transaction by the lightweight node, may also refer to S101 in the embodiment corresponding to FIG. 3, as long as the execution entity is adjusted from the blockchain node to the lightweight node.

S202: The lightweight node sends the first transaction request to the first consensus node, so that the first consensus node performs the first transaction operation on the first blockchain.

The first consensus node stores the complete first blockchain, and the second consensus node stores the complete second blockchain. The lightweight node may store neither the first blockchain nor the second blockchain, but may synchronize a block from the first consensus node (or the second consensus node) at any time. This can reduce the storage requirement of the lightweight node.

As can be seen from the foregoing, the first transaction operation relates to a plurality of operations such as verification, generating a block, and adding the block to the blockchain, but information stored by the lightweight node may become limited. Therefore, the lightweight node may send the first transaction request to the first consensus node, so that the first consensus node performs the first transaction operation on the first blockchain. For a specific process of performing the first transaction operation by the first consensus node, may also refer to S102 in the embodiment corresponding to FIG. 3, as long as the execution entity is adjusted from the blockchain node to the first consensus node.

S203: The lightweight node sends the second transaction request to the second consensus node, so that the second consensus node performs the second transaction operation on the second blockchain.

Similarly, the lightweight node sends the second transaction request to the second consensus node, so that the second consensus node performs the second transaction operation on the second blockchain. For a specific process of performing the second transaction operation by the second consensus node, may also refer to S102 in the embodiment corresponding to FIG. 3, as long as the execution entity is adjusted from the blockchain node to the second consensus node.

S204: The lightweight node obtains an operation result of the first transaction operation that is sent by the first consensus node, and obtains an operation result of the second transaction operation that is sent by the second consensus node.

S205: The lightweight node performs, when an operation result corresponding to any one of the first transaction operation and the second transaction operation is failure, rollback to a transaction operation whose operation result is success.

If the operation result of the first transaction operation is failure and the operation result of the second transaction operation is success, it may be determined that an operation result corresponding to one of the first transaction operation and the second transaction operation is failure. In this case, the lightweight node may use the second transaction operation as the target transaction operation, and notify the second consensus node to perform a rollback to the target transaction operation. For a specific process of performing a rollback to the target transaction operation (that is, the second transaction operation) by the second consensus node, may also refer to S103 in the embodiment corresponding to FIG. 3, as long as the execution entity is adjusted from the blockchain node to the second consensus node.

If the operation result of the first transaction operation is success and the operation result of the second transaction operation is failure, it may also be determined that an operation result corresponding to one of the first transaction operation and the second transaction operation is failure. In this case, the lightweight node may use the first transaction operation as the target transaction operation, and notify the first consensus node to perform a rollback to the target transaction operation (that is, the first transaction operation). For a specific process of performing a rollback to the target transaction operation by the first consensus node, may also refer to S103 in the embodiment corresponding to FIG. 3, as long as the execution entity is adjusted from the blockchain node to the first consensus node.

Certainly, if a transaction operation includes a plurality of sub-operations, only when execution of the plurality of sub-operations all succeeds, it is determined that execution of the transaction operation succeeds. Otherwise, once execution of at least one sub-operation fails, it is determined that execution of the transaction operation fails. Therefore, during rollback processing, the lightweight node not only needs to notify the first consensus node (or the second consensus node) to roll back a transaction operation that succeeds, but also needs to notify the second consensus node (or the first consensus node) to roll back a sub-operation that succeeds in a transaction operation that fails.

In one embodiment, to reduce the storage requirement of the lightweight node, the lightweight node uses the first consensus node (or the second consensus node) to indirectly perform the first transaction operation (or the second transaction operation) on the first blockchain (or the second blockchain). In some examples, the lightweight node may store both the complete first blockchain and the complete second blockchain. In this case, the lightweight node is both a consensus node in the first blockchain network and a consensus node in the second blockchain network. In this case, the lightweight node may directly perform the first transaction operation on the first blockchain, and perform the second transaction operation on the second blockchain without using the first consensus node or the second consensus node.

Figure 5:
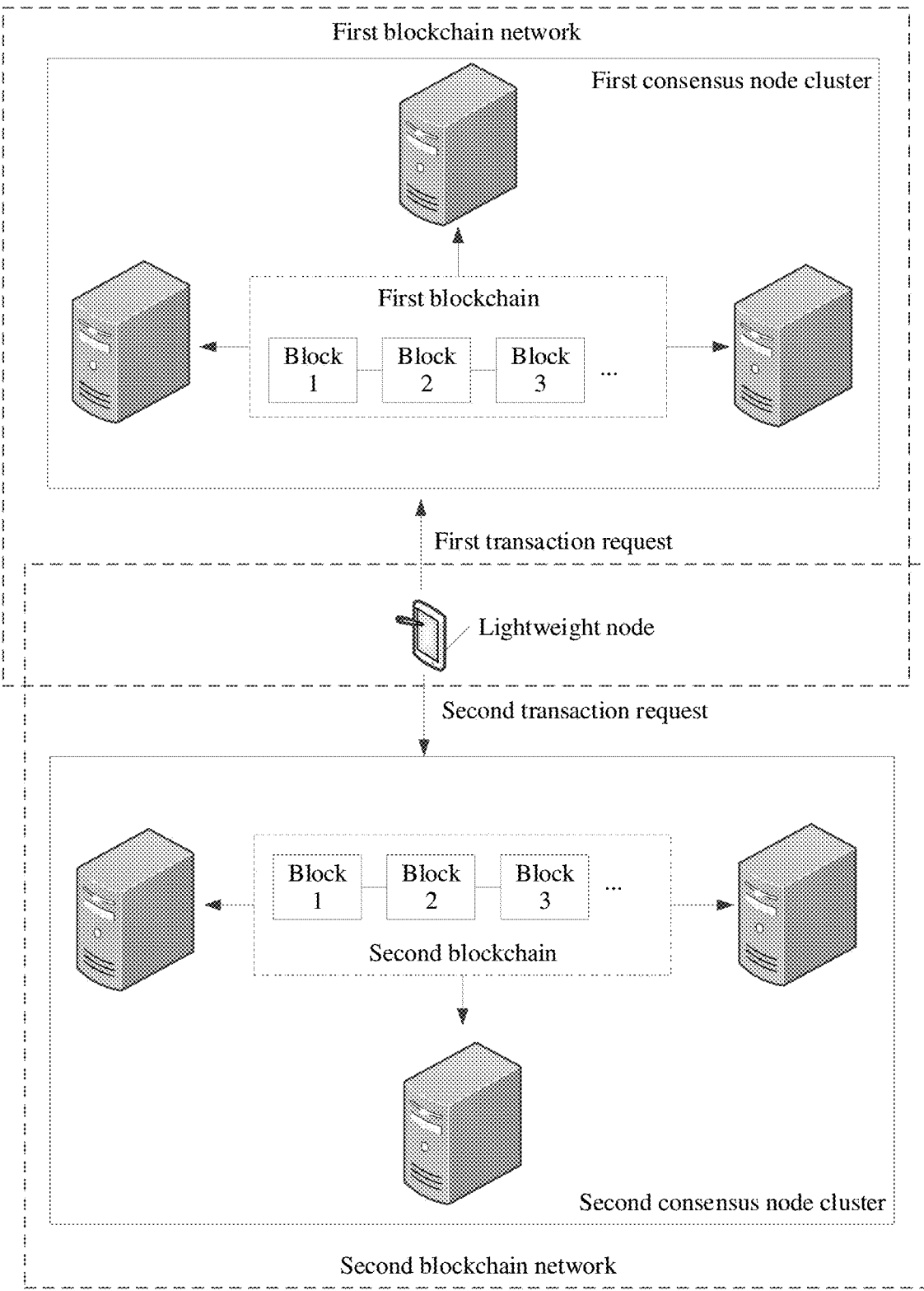
FIG. 5 is a schematic diagram of performing an operation transaction across blockchains according to an embodiment of the application.

FIG. 5 is a schematic diagram of performing a transaction across blockchains according to an embodiment of the application. As can be seen from FIG. 5, the lightweight node and a first consensus node cluster may be combined into the first blockchain network. Any node in the first consensus node cluster stores the first blockchain. The first blockchain includes a block 1, a block 2, a block 3, and the like. The lightweight node and a second consensus node cluster may be combined into the second blockchain network. Any node in the second consensus node cluster stores the second blockchain. The second blockchain includes a block 1, a block 2, a block 3, and the like. The first consensus node cluster and the second consensus node cluster cannot directly communicate with each other, and instead a request may be forwarded through upper-layer routing, a client, or the lightweight node.

The lightweight node may send the first transaction request on the first blockchain to the first consensus node cluster, and the first consensus node cluster performs the first transaction operation corresponding to the first transaction request. Similarly, the lightweight node may send the second transaction request on the second blockchain to the second consensus node cluster, and the second consensus node cluster performs the second transaction operation corresponding to the second transaction request. If the first consensus node cluster succeeds in performing the first transaction operation and the second consensus node cluster fails in performing the second transaction operation, the lightweight node may notify the first consensus node cluster to roll back the first transaction operation. If the first consensus node cluster fails in performing the first transaction operation and the second consensus node cluster succeeds in performing the second transaction operation, the lightweight node may notify the second consensus node cluster to roll back the second transaction operation.

As can be seen from the foregoing, when execution of any one of the first transaction operation on the first blockchain and the second transaction operation on the second blockchain fails, the rollback processing is performed on the transaction operation that succeeds. The rollback processing can ensure consistency of the plurality of operations on the plurality of blockchains, so that the plurality of blockchains can return to a state that exists before the first transaction operation and second transaction operation are performed, to avoid inaccurate transaction data on any blockchain and improve the stability of the blockchain.

Figure 6:
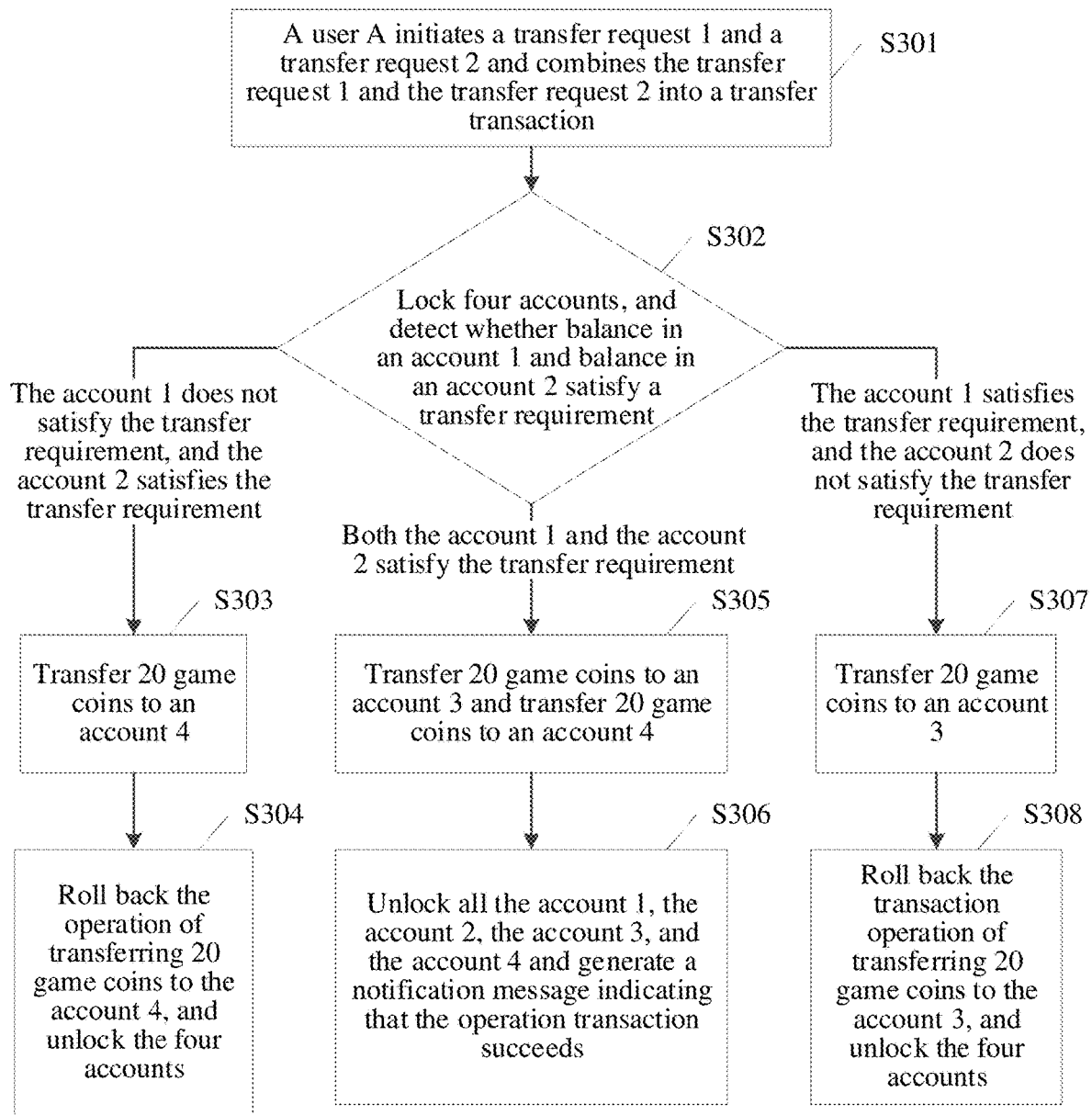
FIG. 6 is a schematic flowchart of a data processing method according to an embodiment of this application.

FIG. 6 is a schematic flowchart of a data processing method according to an embodiment of this application. In this embodiment of this application, how to ensure consistency of a plurality of operations in a scenario of money transfer on a plurality of blockchains is mainly described. The data processing method includes the following steps:

A user A has an account 1 registered on a first blockchain and an account 2 registered on a second blockchain. The user A now needs to transfer money to a user B. The user B has an account 3 registered on the first blockchain and an account 4 registered on the second blockchain.

S301: The user A initiates a transfer request 1 and a transfer request 2 and combines the transfer request 1 and the transfer request 2 into a transfer transaction.

The transfer request 1 is specifically: requesting to transfer 20 game coins from the account 1 to the account 3 on the first blockchain. The user A then initiates the transfer request 2. The transfer request 2 is specifically: requesting to transfer 20 game coins from the account 2 to the account 4 on the second blockchain. In this case, the transfer request 1 may be a first transaction request, and the transfer request 2 may be a second transaction request. The lightweight node combines the transfer request 1 and the transfer request 2 into an operation transaction. The operation transaction herein is a transfer transaction. The transfer request 1 is distributed to a consensus node A corresponding to the first blockchain, and the transfer request 2 is distributed to a consensus node B corresponding to the second blockchain.

Because the transfer request 1 and the transfer request 2 have no dependency relationship, the consensus node A and the consensus node B may concurrently respond to these two requests. If the transfer request 1 and the transfer request 2 have a dependency relationship, the consensus node A and the consensus node B can only serially respond to these two requests.

S302: Lock the four accounts, detect whether balance in the account 1 satisfies a transfer requirement, and detect whether balance in the account 2 satisfies a transfer requirement.

The consensus node A locks the account 1 and the account 3 and detects whether balance in the account 1 is not less than 20 game coins. The consensus node B locks the account 2 and the account 4 and detects whether balance in the account 2 is not less than 20 game coins.

If the balance in the account 1 is less than 20 game coins (that is, the account 1 does not satisfy the transfer requirement) and the balance in the account 2 is not less than 20 game coins (that is, the account 2 satisfies the transfer requirement), S303 and S304 are performed.

If the balance in the account 1 is not less than 20 game coins (that is, the account 1 satisfies the transfer requirement) and the balance in the account 2 is not less than 20 game coins (that is, the account 2 satisfies the transfer requirement), S305 and S306 are performed.

If the balance in the account 1 is not less than 20 game coins (that is, the account 1 satisfies the transfer requirement) and the balance in the account 2 is less than 20 game coins (that is, the account 2 does not satisfy the transfer requirement), S307 and S308 are performed.

S303: Transfer 20 game coins from the account 2 to the account 4.

The consensus node B transfers 20 game coins from the account 2 to the account 4. After the transfer, a new block is generated on the second blockchain, and the block stores a transaction record of the transfer of the game coins. The consensus node B modifies the balance in the account 2 and the balance in the account 4 in the recording table of the blockchain. Certainly, the balance in the account 2 decreases and the balance in the account 4 increases after the modification.

S304: Roll back the operation of transferring 20 game coins from the account 2 to the account 4, and unlock the four accounts.

Because balance in the account 1 is less than 20 game coins, the transfer operation (which may be the first transaction operation) corresponding to the transfer request 1 fails. In this case, the consensus node B performs a rollback to the transfer operation (which may be the second transaction operation) corresponding to the transfer request 2, that is, invalidates the transaction record generated in S303 and revokes the modification of the balance in the account 2 and the balance in the account 4 in the recording table of the blockchain, unlocks all the account 1, the account 2, the account 3, and the account 4, and generates a notification message indicating that the operation transaction fails.

S305: Transfer 20 game coins from the account 1 to the account 3, and transfer 20 game coins from the account 2 to the account 4.

The consensus node A transfers 20 game coins from the account 1 to the account 3. After the transfer, a new block is generated on the first blockchain, and the block stores a transaction record of the transfer of the game coins. The consensus node A modifies the balance in the account 1 and the balance in the account 3 in the recording table of the blockchain. Certainly, the balance in the account 1 decreases and the balance in the account 3 increases after the modification.

The consensus node B transfers 20 game coins from the account 2 to the account 4. After the transfer, a new block is generated on the second blockchain, and the block stores a transaction record of the transfer of the game coins. The consensus node B modifies the balance in the account 2 and the balance in the account 4 in the recording table of the blockchain. Certainly, the balance in the account 2 decreases and the balance in the account 4 increases after the modification.

S306: Unlock the account 1, the account 2, the account 3, and the account 4 and generate a notification message indicating that the operation transaction succeeds.

S307: Transfer 20 game coins from the account 1 to the account 3.

The consensus node A transfers 20 game coins from the account 1 to the account 3. After the transfer, a new block is generated on the first blockchain, and the block stores a transaction record of the transfer of the game coins. The consensus node A modifies the balance in the account 1 and the balance in the account 3 in the recording table of the blockchain. Certainly, the balance in the account 1 decreases and the balance in the account 3 increases after the modification.

S308: Roll back the transaction operation of transferring 20 game coins from the account 1 to the account 3, and unlock the four accounts.

Because balance in the account 2 is less than 20 game coins, the transfer operation corresponding to the transfer request 2 fails. In this case, the consensus node A performs a rollback to the transfer operation corresponding to the transfer request 1, that is, invalidates the transaction record generated in S307 and revokes the modification of the balance in the account 1 and the balance in the account 3 in the recording table of the blockchain, unlocks all the account 1, the account 2, the account 3, and the account 4, and generates a notification message indicating that the operation transaction fails.

Subsequently, when the balances in the four accounts are counted based on blocks on the blockchain, if a transaction record in a block has been invalidated, the transaction record does not need to be counted when balances of the accounts are counted.

In some examples, this application may also be applied to execution of a transfer transaction (that is, an operation transaction) that includes a plurality of transfer requests on one blockchain. In the following, for example, money is transferred from the account 1 to both the account 3 and an account 5 on a blockchain.

The transfer request 1 is specifically: requesting to transfer 20 game coins from the account 1 to the account 3, and the transfer request 2 is specifically: requesting to transfer 20 game coins from the account 1 to the account 5.

Because the transfer request 1 and the transfer request 2 have a dependency relationship, these two requests can only be serially responded to. The transfer request 1 is first responded to, the account 1 and the account 3 are locked, and it is detected whether the balance in the account 1 is not less than 20.

If not, the procedure is ended, and the notification message indicating that the transfer transaction fails is generated.

If yes, 20 game coins are transferred from the account 1 to the account 3. After the transfer, a new block is generated on the blockchain, and the block is used to store a transaction record of the transfer of the game coins. The balance in the account 1 and the balance in the account 3 are modified in the recording table of the blockchain. Certainly, the balance in the account 1 decreases and the balance in the account 3 increases after the modification.

After the transfer request 1 is successfully responded to, the transfer request 2 is responded to, the account 5 is locked, and it is detected whether the balance in the account 1 is not less than 20 (in this case, the balance in the account 1 has decreased by 20 game coins).

If not, the transaction record in the new generated block is invalidated, the modification of the balance in the account 1 and the balance in the account 3 in the recording table of the blockchain is revoked, and a notification message indicating that the transfer transaction fails is generated.

If yes, 20 game coins are transferred from the account 1 to the account 5. After the transfer, an additional new block is generated on the blockchain, and the block is used to store a transaction record of the transfer of the game coins. The balance in the account 1 and the balance in the account 5 are modified again in the recording table of the blockchain. Certainly, the balance in the account 1 decreases again and the balance in the account 5 increases after the modification, and a notification message indicating that the transfer transaction succeeds is generated.

Figure 7:
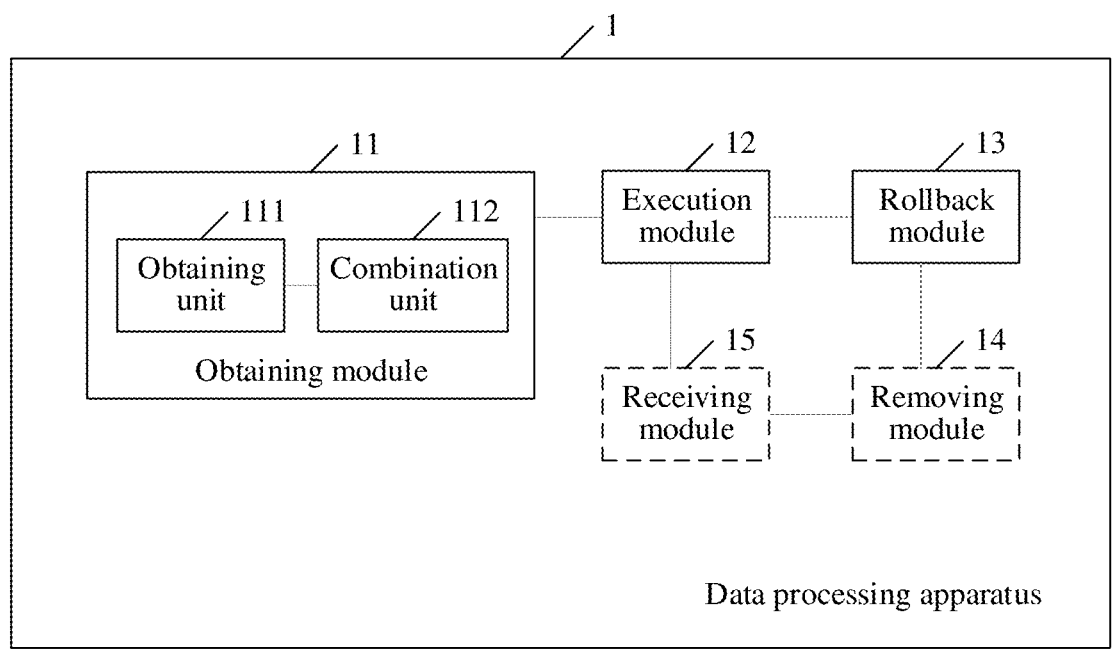
FIG. 7 is a schematic structural diagram of a data processing apparatus according to an embodiment of this application.

FIG. 7 is a schematic structural diagram of a data processing apparatus according to an embodiment of this application. As shown in FIG. 7, a data processing apparatus 1 may be applied to the blockchain node in the embodiment corresponding to FIG. 3 and the lightweight node in the embodiments corresponding to FIG. 4 to FIG. 6. The data processing apparatus 1 may be a computer program (including program code) running in a computer device, for example, the data processing apparatus 1 is application software. The data processing apparatus 1 may be configured to perform the corresponding steps in the method provided in the embodiments of this application.

The data processing apparatus 1 may include: an obtaining module 11, an execution module 12, and a rollback module 13.

The obtaining module 11 is configured to obtain an operation transaction on a blockchain. The operation transaction includes a first transaction request and a second transaction request.

The execution module 12 is configured to: perform a first transaction operation corresponding to the first transaction request, and perform a second transaction operation corresponding to the second transaction request on the blockchain.

The rollback module 13 is configured to perform, when an operation result corresponding to any one of the first transaction operation and the second transaction operation is failure, rollback to a transaction operation whose operation result is success.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The rollback module 13 is configured to:

when the first transaction operation is a transaction operation whose operation result is failure and the second transaction operation is a transaction operation whose operation result is success, use the second transaction operation as a target transaction operation and perform a rollback to the target transaction operation; or when the second transaction operation is a transaction operation whose operation result is failure and the first transaction operation is a transaction operation whose operation result is success, use the first transaction operation as a target transaction operation and perform a rollback to the target transaction operation.

In an embodiment, the target transaction operation includes a transfer operation and an adjustment operation, the transfer operation is transferring resource data whose quantity is the same as a target transaction quantity on the blockchain, and the adjustment operation is adjusting a remaining resource quantity of a target transaction account in a transaction recording table associated with the blockchain; the transaction recording table is used to record remaining resource quantities of all transaction accounts on the blockchain; and a transaction request corresponding to the target transaction operation includes the target transaction quantity and the target transaction account.

In an embodiment, when performing a rollback to the target transaction operation, the rollback module 13 is configured to: perform invalidation processing on a target transaction record stored in a target block; where the target block belongs to the blockchain, the target block is a block generated after the transfer operation is performed, and the target block is used to store the target transaction record; and update the remaining resource quantity of the target transaction account in the transaction recording table according to the target transaction quantity; where the updated remaining resource quantity of the target transaction account is the same as a remaining resource quantity of the target transaction account that exists before the adjustment operation is performed.

For one example one example of functions of the obtaining module 11, the execution module 12, and the rollback module 13, may also refer to S101 to S103 in the embodiment corresponding to FIG. 3.

Referring to FIG. 7 again, the obtaining module 11 may include: an obtaining unit 111 and a combination unit 112.

The obtaining unit 111 is configured to obtain the first transaction request and the second transaction request on the blockchain.

The combination unit 112 is configured to: determine an operation sequence of the first transaction request and the second transaction request, and combine the first transaction request and the second transaction request into the operation transaction according to the operation sequence.

In an embodiment, the operation sequence includes: a parallel operation sequence and a serial operation sequence; and the obtaining unit 111 is configured to: when the first transaction request and the second transaction request have a data dependency relationship, determine that the operation sequence of the first transaction request and the second transaction request is the serial operation sequence; or when the first transaction request and the second transaction request have no data dependency relationship, determine that the operation sequence of the first transaction request and the second transaction request is the parallel operation sequence.

For one example of functions of the obtaining unit 111 and the combination unit 112, may also refer to S101 in the embodiment corresponding to FIG. 3.

In an embodiment, the blockchain includes a first blockchain and a second blockchain, and the first blockchain and the second blockchain are associated; the first transaction request is a request on the first blockchain, and the second transaction request is a request on the second blockchain.

The execution module 12 is configured to: perform the first transaction operation corresponding to the first transaction request on the first blockchain, and perform the second transaction operation corresponding to the second transaction request on the second blockchain.

In an embodiment, the data processing method is performed by a lightweight node. The first blockchain corresponds to a first blockchain network, and the second blockchain corresponds to a second blockchain network. The first blockchain network includes the lightweight node and a first consensus node, and the second blockchain network includes the lightweight node and a second consensus node.

When performing the first transaction operation corresponding to the first transaction request on the first blockchain, and performing the second transaction operation corresponding to the second transaction request on the second blockchain, the execution module 12 is configured to: send the first transaction request to the first consensus node, so that the first consensus node performs the first transaction operation on the first blockchain; and send the second transaction request to the second consensus node, so that the second consensus node performs the second transaction operation on the second blockchain.

For a specific function implementation of the execution module 12, reference may be made to S202 to S203 in the embodiment corresponding to FIG. 4.

Referring to FIG. 7, the first transaction request includes a first transaction account, the second transaction request includes a second transaction account, and when the first transaction operation and the second transaction operation are performed, the first transaction account and the second transaction account are in a locked state.

The data processing apparatus 1 may include: an obtaining module 11, an execution module 12, and a rollback module 13. The data processing apparatus 1 may further include: a removing module 14.

The removing module 14 is configured to: remove the locked state of the first transaction account and the second transaction account, and generate a notification message indicating that execution of the operation transaction fails.

For a specific implementation of a function of the removing module 14, may also refer to S103 in the embodiment corresponding to FIG. 3.

Referring to FIG. 7, the data processing apparatus 1 may include: an obtaining module 11, an execution module 12, and a rollback module 13. The data processing apparatus 1 may further include: a receiving module 15.

The receiving module 15 is configured to: receive the operation result of the first transaction operation that is sent by the first consensus node, and receive the operation result of the second transaction operation that is sent by the second consensus node.

For a specific implementation of a function of the receiving module 15, may also refer to S204 in the embodiment corresponding to FIG. 4.

Figure 8:
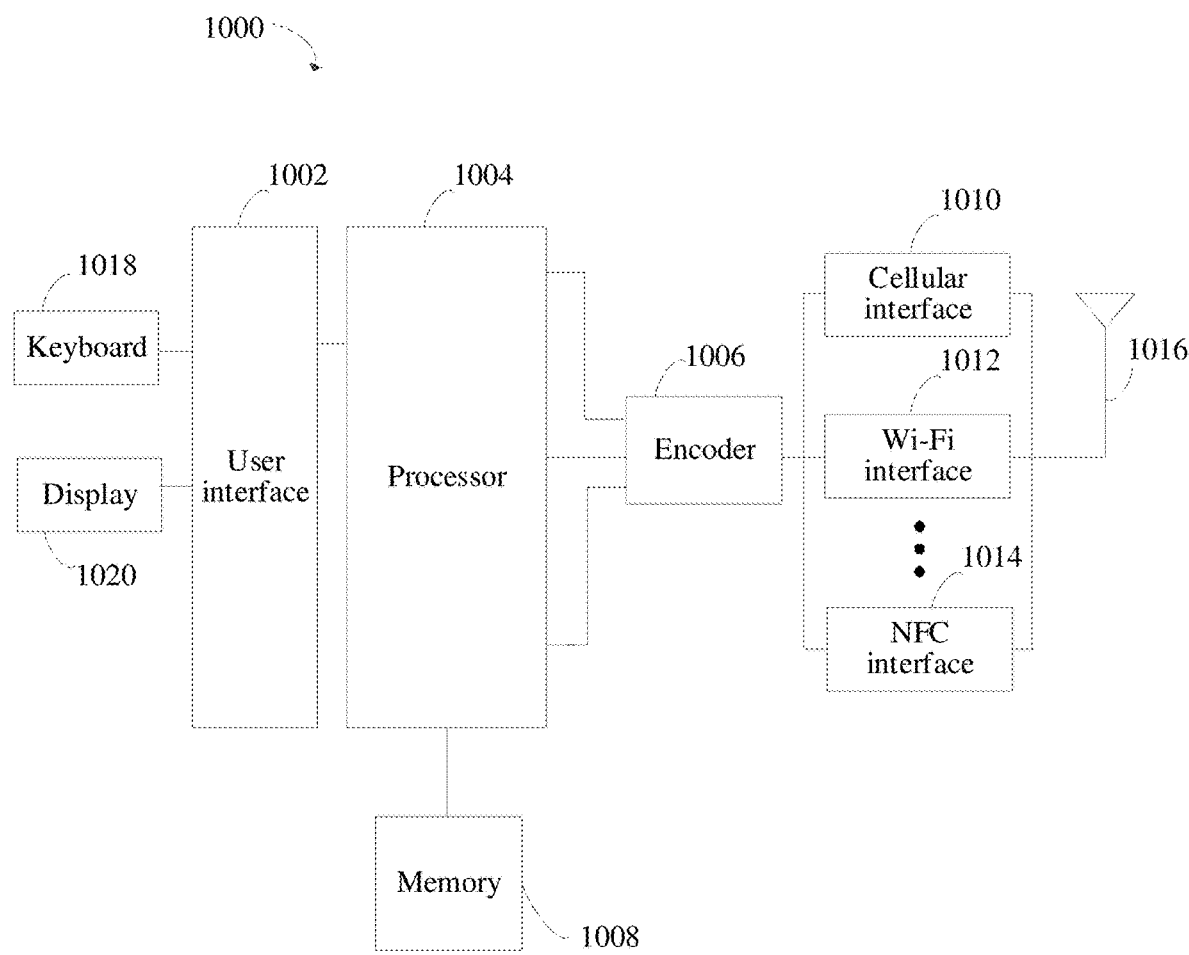
FIG. 8 is a schematic structural diagram of a computer device according to an embodiment of this application.

FIG. 8 is a schematic structural diagram of a computer device according to an embodiment of this application. The blockchain node in the embodiment corresponding to FIG. 3 and the lightweight node in the embodiments corresponding to FIG. 4 to FIG. 6 may be a computer device 1000. As shown in FIG. 8, the computer device 1000 may include a user interface 1002, a processor 1004, an encoder 1006, and a memory 1008. The signal receiver 1016 is configured to receive or send data through a cellular interface 1010, a Wi-Fi interface 1012, . . . , or an NFC interface 1014. The encoder 1006 encodes received data into a data format processed by a computer. The memory 1008 stores a computer program, and the processor 1004 is configured to perform the steps in any one of the foregoing method embodiments through the computer program. The memory 1008 may include a volatile memory (for example, a dynamic random access memory DRAM), and may also include a non-volatile memory (for example, a one time programmable read-only memory OTPROM). In some examples, the memory 1008 may further include memories remotely disposed relative to the processor 1004, and these remote memories may be connected to the computer device 1000 through a network. The user interface 1002 may include: a keyboard 1018 and a display 1020.

In the computer device 1000 shown in FIG. 8, the processor 1004 may be configured to call the computer program stored in the memory 1008 to perform the following steps:

obtaining an operation transaction on a blockchain; the operation transaction including a first transaction request and a second transaction request;

performing a first transaction operation corresponding to the first transaction request, and performing a second transaction operation corresponding to the second transaction request on the blockchain; and performing, when an operation result corresponding to any one of the first transaction operation and the second transaction operation is failure, rollback to a transaction operation whose operation result is success.

It should be understood that the computer device 1000 described in this embodiment of this application may perform the data processing methods in the foregoing embodiments corresponding to FIG. 3 to FIG. 6, and may also perform steps performed by the data processing apparatus 1 in the foregoing embodiment corresponding to FIG. 7. The description already provided may also apply to this embodiment.

In addition, an embodiment of this application further provides a computer storage medium. The computer storage medium stores computer programs executed by the foregoing data processing apparatus 1. The computer program includes program instructions. When executing the program instructions, a processor may perform the data processing method described in the foregoing embodiments corresponding to FIG. 3 to FIG. 6. The description already provided may apply to this embodiment. For technical details that are not disclosed in the computer storage medium embodiments of this application, the descriptions of the method embodiments may apply in some examples. By way of example, the program instructions may be deployed and executed on one computer device, or executed on a plurality of computer devices located at one site, or executed on a plurality of computer devices distributed at a plurality of sites and interconnected by a communication network. The plurality of computer devices distributed at a plurality of sites and interconnected by a communication network may be combined into a blockchain network.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely example embodiments of this application, and certainly is not intended to limit the scope of the claims of this application. Therefore, equivalent variations made in accordance with the claims of this application shall fall within the scope of this application.

What is claimed is:

1. A method comprising:
obtaining an operation transaction on a blockchain, wherein the operation transaction comprises a first transaction request and a second transaction request;
performing a first transaction operation corresponding to the first transaction request on the blockchain;
performing a second transaction operation corresponding to the second transaction request on the blockchain; and
performing, when an operation result corresponding to either one of the first transaction operation or the second transaction operation is failure, a rollback on a transaction operation whose operation result was a success,
wherein:
the rollback is performed on a target transaction operation comprising a transfer operation and an adjustment operation; and
the transfer operation comprises transferring resource data whose quantity is the same as a target transaction quantity on the blockchain, and the adjustment operation comprises adjusting a remaining resource quantity of a target transaction account in a transaction recording table associated with the blockchain.

2. The method according to claim 1, wherein the first transaction request comprises a first transaction account, the second transaction request comprises a second transaction account, and when the first transaction operation and the second transaction operation are performed, the first transaction account and the second transaction account are in a locked state; wherein after the operation of performing the rollback, the method further comprises:
removing the locked state of the first transaction account and removing the locked state of the second transaction account; and
generating a notification message indicating that execution of the first transaction operation or the second transaction operation is a failure.

3. The method according to claim 1, wherein the performing the rollback further comprises:
using, when the first transaction operation is a transaction operation whose operation result is failure and the second transaction operation is a transaction operation whose operation result is success, the second transaction operation as the target transaction operation; or
using, when the second transaction operation is a transaction operation whose operation result is failure and the first transaction operation is a transaction operation whose operation result is success, the first transaction operation as the target transaction operation.

4. The method according to claim 3, wherein the transaction recording table is used to record remaining resource quantities of all transaction accounts on the blockchain, and a transaction request corresponding to the target transaction operation comprises the target transaction quantity and the target transaction account.

5. The method according to claim 4, wherein the performing the rollback on the target transaction operation further comprises:
performing invalidation processing on a target transaction record stored in a target block, wherein the target block belongs to the blockchain and is a block generated after the transfer operation is performed, and wherein the target block is used to store the target transaction record; and
updating the remaining resource quantity of the target transaction account in the transaction recording table according to the target transaction quantity, wherein the updated remaining resource quantity of the target transaction account is the same as a remaining resource quantity of the target transaction account that exists before the adjustment operation is performed.

6. The method according to claim 1, wherein the obtaining the operation transaction further comprises:
obtaining the first transaction request and the second transaction request on the blockchain; and
determining an operation sequence of the first transaction request and the second transaction request; and
combining the first transaction request and the second transaction request into the operation transaction according to the operation sequence.

7. The method according to claim 6, wherein the operation sequence comprises:
a parallel operation sequence and a serial operation sequence; and
wherein the determining the operation sequence further comprises:
determining, when the first transaction request and the second transaction request have a data dependency relationship, that the operation sequence of the first transaction request and the second transaction request is the serial operation sequence; or
determining, when the first transaction request and the second transaction request have no data dependency relationship, that the operation sequence of the first transaction request and the second transaction request is the parallel operation sequence.

8. The method according to claim 1, wherein the blockchain comprises a first blockchain and a second blockchain that are associated with one another, wherein the first transaction request is a request on the first blockchain, and the second transaction request is a request on the second blockchain, further and wherein the performing the first transaction operation and performing the second transaction operation further comprises:
performing the first transaction operation corresponding to the first transaction request on the first blockchain; and
performing the second transaction operation corresponding to the second transaction request on the second blockchain.

9. The method according to claim 8, wherein the data processing method is performed by a lightweight node, the first blockchain corresponds to a first blockchain network, the second blockchain corresponds to a second blockchain network, the first blockchain network comprises the lightweight node and a first consensus node, and the second blockchain network comprises the lightweight node and a second consensus node, and wherein the performing the first transaction operation corresponding to the first transaction request on the first blockchain and performing the second transaction operation corresponding to the second transaction request on the second blockchain further comprises:
    transmitting the first transaction request to the first consensus node, which is configured to perform the first transaction operation on the first blockchain; and
    transmitting the second transaction request to the second consensus node, which is configured to perform the second transaction operation on the second blockchain.

10. The method according to claim 9, further comprising:
    receiving the operation result of the first transaction operation that is sent by the first consensus node; and
    receiving the operation result of the second transaction operation that is sent by the second consensus node.

11. A computer device, comprising a memory and a processor, the memory storing a computer program, and when the computer program is executed by the processor, the processor being caused to perform operations of the method according to claim 1.

12. A data processing apparatus comprising a memory and a processor, the memory storing a computer program, and when the computer program is executed by the processor, the processor being caused to perform:
    obtaining an operation transaction on a blockchain that comprises a first transaction request and a second transaction request;
    performing a first transaction operation corresponding to the first transaction request on the blockchain;
    performing a second transaction operation corresponding to the second transaction request on the blockchain; and
    performing a rollback operation when an operation result corresponding to either the first transaction operation or the second transaction operation being a failure, wherein the rollback operation comprises processing on a transaction operation whose operation result was a success, the rollback being performed on a target transaction operation comprising a transfer operation and an adjustment operation; and wherein the transfer operation comprises transferring resource data whose quantity is the same as a target transaction quantity on the blockchain, and the adjustment operation comprises adjusting a remaining resource quantity of a target transaction account in a transaction recording table associated with the blockchain.

13. The data processing apparatus according to claim 12, wherein the first transaction request comprises a first transaction account, the second transaction request comprises a second transaction account, and when the first transaction operation and the second transaction operation are performed, the first transaction account and the second transaction account are in a locked state; wherein after the operation of performing the rollback, the method further comprises:
    removing the locked state of the first transaction account and removing the locked state of the second transaction account; and
    generating a notification message indicating that execution of the first transaction operation or the second transaction operation is a failure.

14. The data processing apparatus according to claim 12, wherein the performing the rollback further comprises:
    using, when the first transaction operation is a transaction operation whose operation result is failure and the second transaction operation is a transaction operation whose operation result is success, the second transaction operation as the target transaction operation; or
    using, when the second transaction operation is a transaction operation whose operation result is failure and the first transaction operation is a transaction operation whose operation result is success, the first transaction operation as the target transaction operation.

15. The data processing apparatus according to claim 14, wherein the transaction recording table is used to record remaining resource quantities of all transaction accounts on the blockchain, and a transaction request corresponding to the target transaction operation comprises the target transaction quantity and the target transaction account.

16. The data processing apparatus according to claim 15, wherein the performing the rollback on the target transaction operation further comprises:
    performing invalidation processing on a target transaction record stored in a target block, wherein the target block belongs to the blockchain and is a block generated after the transfer operation is performed, and wherein the target block is used to store the target transaction record; and
    updating the remaining resource quantity of the target transaction account in the transaction recording table according to the target transaction quantity, wherein the updated remaining resource quantity of the target transaction account is the same as a remaining resource quantity of the target transaction account that exists before the adjustment operation is performed.

17. A non-transitory computer storage medium, storing a computer program, the computer program comprising program instructions, and the program instructions, when executed by a processor, performing:
    obtaining an operation transaction on a blockchain, wherein the operation transaction comprises a first transaction request and a second transaction request;
    performing a first transaction operation corresponding to the first transaction request on the blockchain;
    performing a second transaction operation corresponding to the second transaction request on the blockchain; and
    performing, when an operation result corresponding to either one of the first transaction operation or the second transaction operation is failure, a rollback on a transaction operation whose operation result was a success,
    wherein:
        the rollback is performed on a target transaction operation comprising a transfer operation and an adjustment operation; and
        the transfer operation comprises transferring resource data whose quantity is the same as a target transaction quantity on the blockchain, and the adjustment operation comprises adjusting a remaining resource quantity of a target transaction account in a transaction recording table associated with the blockchain.

18. The computer storage medium according to claim 17, wherein the obtaining the operation transaction further comprises:
    obtaining the first transaction request and the second transaction request on the blockchain; and determining an operation sequence of the first transaction request and the second transaction request; and combining the first transaction request and the second transaction request into the operation transaction according to the operation sequence;

wherein the operation sequence comprises:

a parallel operation sequence and a serial operation sequence; and wherein the determining the operation sequence further comprises:

determining, when the first transaction request and the second transaction request have a data dependency relationship, that the operation sequence of the first transaction request and the second transaction request is the serial operation sequence; or determining, when the first transaction request and the second transaction request have no data dependency relationship, that the operation sequence of the first transaction request and the second transaction request is the parallel operation sequence.

19. The computer storage medium according to claim 17, wherein the blockchain comprises a first blockchain and a second blockchain that are associated with one another, wherein the first transaction request is a request on the first blockchain, and the second transaction request is a request on the second blockchain, and wherein the performing the first transaction operation and performing the second transaction operation further comprises:

performing the first transaction operation corresponding to the first transaction request on the first blockchain; and performing the second transaction operation corresponding to the second transaction request on the second blockchain.

20. The computer storage medium according to claim 19, wherein the first blockchain corresponds to a first blockchain network, the second blockchain corresponds to a second blockchain network, the first blockchain network comprises a lightweight node and a first consensus node, and the second blockchain network comprises the lightweight node and a second consensus node, and wherein the performing the first transaction operation corresponding to the first transaction request on the first blockchain and performing the second transaction operation corresponding to the second transaction request on the second blockchain further comprises:

transmitting the first transaction request to the first consensus node, which is configured to perform the first transaction operation on the first blockchain; and transmitting the second transaction request to the second consensus node, which is configured to perform the second transaction operation on the second blockchain.

* * * * *